US011900224B2

(12) United States Patent
Refaat et al.

(10) Patent No.: US 11,900,224 B2
(45) Date of Patent: Feb. 13, 2024

(54) GENERATING TRAJECTORY LABELS FROM SHORT-TERM INTENTION AND LONG-TERM RESULT

(71) Applicant: Waymo LLC, Mountain View, CA (US)

(72) Inventors: Khaled Refaat, Mountain View, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 1016 days.

(21) Appl. No.: 16/727,724

(22) Filed: Dec. 26, 2019

(65) Prior Publication Data
US 2021/0200229 A1 Jul. 1, 2021

(51) Int. Cl.
G06N 20/00 (2019.01)
G05D 1/00 (2006.01)
(Continued)

(52) U.S. Cl.
CPC ......... G06N 20/00 (2019.01); B60W 50/0097 (2013.01); B60W 60/0027 (2020.02);
(Continued)

(58) Field of Classification Search
CPC ......... B60W 60/0027; B60W 50/0097; B60W 2554/40; G06N 20/00; G06N 3/047; G06N 3/049; G05D 1/0088; G05D 1/0221
See application file for complete search history.

(56) References Cited

U.S. PATENT DOCUMENTS 7,447,593 B2 11/2008 Estkowski et al.
9,417,070 B1 8/2016 Herriot
(Continued)

FOREIGN PATENT DOCUMENTS

CN 109272108 A 1/2019
CN 109937343 6/2019
(Continued)

OTHER PUBLICATIONS

EP Extended Search Report in European Appln. No. 20214924.1, dated May 27, 2021, 11 pages.
(Continued)

Primary Examiner — Peter D Nolan
Assistant Examiner — Mikko Okechukwu Obioha
(74) Attorney, Agent, or Firm — Fish & Richardson P.C.

(57) ABSTRACT

Methods, systems, and apparatus, including computer programs encoded on computer storage media, for generating training data for training a machine learning model to perform trajectory prediction. One of the methods includes: obtaining a training input, the training input including (i) data characterizing an agent in an environment as of a first time and (ii) data characterizing a candidate trajectory of the agent in the environment for a first time period that is after the first time. A long-term label for the candidate trajectory that indicates whether the agent actually followed the candidate trajectory for the first time period is determined. A short-term label for the candidate trajectory that indicates whether the agent intended to follow the candidate trajectory is determined. A ground-truth probability for the candidate trajectory is determined. The training input is associated with the ground-truth probability for the candidate trajectory in the training data.

18 Claims, 4 Drawing Sheets

(51) Int. Cl.
*G05D 1/02* (2020.01)
*G06N 3/049* (2023.01)
*B60W 50/00* (2006.01)
*B60W 60/00* (2020.01)
*G06N 3/047* (2023.01)

(52) U.S. Cl.
CPC ......... *G05D 1/0088* (2013.01); *G05D 1/0221* (2013.01); *G05D 1/0246* (2013.01); *G06N 3/047* (2023.01); *G06N 3/049* (2013.01); *B60W 2554/40* (2020.02)

(56) References Cited

U.S. PATENT DOCUMENTS

| | | | | |
|---|---|---|---|---|
| 9,443,153 | B1* | 9/2016 | Gupta | G07C 5/08 |
| 9,691,286 | B2 | 6/2017 | Bahrami et al. | |
| 11,195,418 | B1* | 12/2021 | Hong | G08G 1/166 |
| 11,433,922 | B1* | 9/2022 | Van Heukelom | G05D 1/0221 |
| 2018/0374359 | A1 | 12/2018 | Li et al. | |
| 2019/0034794 | A1 | 1/2019 | Ogale et al. | |
| 2019/0129436 | A1 | 5/2019 | Sun et al. | |
| 2019/0302767 | A1 | 10/2019 | Sapp et al. | |
| 2019/0308620 | A1 | 10/2019 | Sapp et al. | |
| 2019/0367019 | A1* | 12/2019 | Yan | B60W 30/0956 |
| 2019/0367020 | A1* | 12/2019 | Yan | G06F 18/295 |
| 2021/0004966 | A1* | 1/2021 | Behrendt | G06T 7/246 |

FOREIGN PATENT DOCUMENTS

| | | |
|---|---|---|
| CN | 110248861 A | 9/2019 |
| CN | 110574046 A | 12/2019 |
| CN | 110610271 A | 12/2019 |
| WO | WO 2008/086156 | 7/2008 |
| WO | WO 2019/191000 | 10/2019 |
| WO | WO 2019/222745 | 11/2019 |

OTHER PUBLICATIONS

Mozaffari et al., "Deep Learning-based Vehicle Behavior Prediction for Autonomous Driving Applications: A Review," IEEE Transactions on Intelligent Transportation Systems, Aug. 2020, pp. 1-15.

Oyama et al., "Estimation of a human planned trajectory from a measured trajectory," 2004 IEEE International Conference on Systems, Man and Cybernetics, Oct. 2004, 1(10):728-734.

Office Action in Chinese Appln. No. 202011492384.5, dated Sep. 28, 2023, 13 pages (with English translation).

* cited by examiner

GENERATING TRAJECTORY LABELS FROM SHORT-TERM INTENTION AND LONG-TERM RESULT

BACKGROUND

This specification relates to autonomous vehicles.

Autonomous vehicles include self-driving cars, boats, and aircrafts. Autonomous vehicles use behavior prediction models to generate behavior predictions, e.g., vehicle trajectory prediction, and use such behavior predictions to make control and navigation decisions. The behavior prediction models can include one or more trained machine learning models that select which trajectory, e.g., left turn, right turn, driving straight, etc., is predicted to occur in the future. These machine learning models are trained using labeled training data.

Some autonomous vehicles have computer systems that implement neural networks for vehicle trajectory prediction. For example, a neural network can be used to determine a vehicle in an image captured by an on-board camera is likely to make a left turn in a future period of time.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes how a computer system can generate training data for training a machine learning model to perform trajectory prediction, wherein the training data includes trajectory labels from short-term intention and long-term results.

In general, one innovative aspect of the subject matter described in this specification can be embodied in methods that include the actions of obtaining a training input, the training input comprising (i) data characterizing an agent in an environment as of a first time and (ii) data characterizing a candidate trajectory of the agent in the environment for a first time period that is after the first time; determining a long-term label for the candidate trajectory that indicates whether the agent actually followed the candidate trajectory for the first time period after the first time; determining a short-term label for the candidate trajectory that indicates whether the agent intended to follow the candidate trajectory; determining, based on the long-term label and the short-term label for the candidate trajectory, a ground-truth probability for the candidate trajectory, wherein the ground-truth probability for the candidate trajectory is a probability that should be assigned to the candidate trajectory by the machine learning model; and associating the training input with the ground-truth probability for the candidate trajectory in the training data. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The actions include training the machine learning model on the training data. Determining, based on the long-term label and the short-term label for the candidate trajectory, a ground-truth probability for the candidate trajectory includes: determining that the long-term label indicates that agent actually followed the candidate trajectory after the first time; determining that the short-term label indicates that the agent intended to follow the candidate trajectory; and based on determining that the long-term label indicates that agent actually followed the candidate trajectory after the first time and determining that the short-term label indicates that the agent intended to follow the candidate trajectory, setting the ground-truth probability for the candidate trajectory equal to 1. Determining, based on the long-term label and the short-term label for the candidate trajectory, a ground-truth probability for the candidate trajectory includes: determining that the long-term label indicates that agent did not actually follow the candidate trajectory after the first time; determining that the short-term label indicates that the agent did not intend to follow the candidate trajectory; and based on determining that the long-term label indicates that agent did not actually follow the candidate trajectory after the first time and determining that the short-term label indicates that the agent did not intend to follow the candidate trajectory, setting the ground-truth probability for the candidate trajectory equal to 0. Determining, based on the long-term label and the short-term label for the candidate trajectory, a ground-truth probability for the candidate trajectory includes: determining that the long-term label indicates that agent actually followed the candidate trajectory after the first time; determining that the short-term label indicates that the agent did not intend to follow the candidate trajectory; and based on determining that the long-term label indicates that agent actually followed the candidate trajectory after the first time and determining that the short-term label indicates that the agent did not intend to follow the candidate trajectory, setting the ground-truth probability for the candidate trajectory equal to a first value between zero and one. Determining, based on the long-term label and the short-term label for the candidate trajectory, a ground-truth probability for the candidate trajectory includes: determining that the long-term label indicates that agent did not actually follow the candidate trajectory after the first time; determining that the short-term label indicates that the agent intended to follow the candidate trajectory; and based on determining that the long-term label indicates that agent did not actually follow the candidate trajectory after the first time and determining that the short-term label indicates that the agent intended to follow the candidate trajectory, setting the ground-truth probability for the candidate trajectory equal to a second value between zero and one. Determining, based on the long-term label and the short-term label for the candidate trajectory, a ground-truth probability for the candidate trajectory includes: determining that the long-term label is inconsistent with the short-term label, comprising: determining that the long-term label indicates that agent did not actually follow the candidate trajectory after the first time and the short-term label indicates that the agent intended to follow the candidate trajectory, or determining that the long-term label indicates that agent actually followed the candidate trajectory after the first time and determining that the short-term label indicates that the agent did not intend to follow the candidate trajectory; obtaining context information of the environment; based on the context information of the environment, generating an updated short-term label using one or more predetermined rules; and based on the long-term label and the updated short-term label for the candidate trajectory, determining a ground-truth probability for the candidate trajectory. Determining a long-term label for the candidate trajectory that indicates whether the agent actually followed the candidate trajectory after the first time includes: determining whether log data that tracks movement of the agent after the first time indicates that the agent followed the candidate trajectory after the first time. Determining a short-term label for the candidate trajectory that indicates whether the agent intended to follow the candidate trajectory includes: determining whether the agent followed the candidate trajectory for an initial time period immediately after the first time, wherein the initial time period is shorter than the first time period. Determining a short-term label for the candidate trajectory that indicates whether the agent intended to follow the candidate trajectory includes: determining whether the agent had a heading that matches a heading required to follow the candidate trajectory for an initial time period immediately after the first time. Determining a short-term label for the candidate trajectory that indicates whether the agent intended to follow the candidate trajectory includes: determining, from appearance information characterizing an appearance of the agent within a first time window after the first time, whether the agent intended to follow the candidate trajectory. The agent is a vehicle, and the appearance information indicates whether any of one or more turn signals of the vehicle are turned on.

Particular embodiments of the subject matter described in this specification can be implemented so as to realize one or more of the following advantages.

Conventionally, labels for training examples are generated based on what actually happened in a future time period. For example, an auto-labeling approach can be used to label training examples automatically by searching for what happened in the logs that record the history of what the vehicle ended up doing in the future time period. However, this conventional approach labels data based on what happened in a future time period rather than what the vehicle intended to do at the time of prediction. Therefore, it is difficult to train or evaluate behavior prediction machine learning models using the labeled training data generated by the conventional approach.

Particular embodiments of the subject matter described in this specification describe generating training data for training a machine learning model, e.g., a neural network, to perform trajectory prediction based on both short-term intentions and long-term results. The training data includes a ground-truth probability for a candidate trajectory that is determined based on both a long-term label for the candidate trajectory and a short-term label for the candidate trajectory.

The training examples including trajectory labels generated from both long-term result and short-term intent can be used to train a machine learning model that generates a score for a candidate trajectory. These training examples can also be used to train a machine learning model that generates a trajectory prediction that includes a series of locations of an agent in a future period of time.

The training examples including trajectory labels generated from both long-term result and short-term intent can capture complex, real world situations in an environment. Machine learning models can be easier to train and learn meaningful features or cues of an input data of an environment from these trajectory labels because the trajectory labels captures both what the agent intended to do and what ended up happening in the future.

For example, 8 training examples can include similar training inputs, each of which captures that an agent is driving straight at the current moment in a similar context. Among the long-term labels for the 8 training examples, some long-term labels indicate that the agent ended up following a lane change trajectory, and some long-term labels indicate that the agent ended up moving straight. A machine learning model may not find useful features that can be used to predict a lane change trajectory in some of the training examples because the eight very similar contexts ended up with different long-term results. With the additional information from short-term labels, a ground-truth probability can be determined based on both a short-term intent and the long-term result. The machine learning model can be trained based on more meaningful and authentic training examples. For example, a short-term label for any of the eight examples in which the agent did not change lanes may indicate that the agent intended to change lanes, but was ultimately prevented from doing so due to something that occurred later in the environment.

Additionally, context information from the environment can be used to accept or reject the short-term intentions that are used in determining the ground-truth probability in the training data. More generally, by being able to accurate predicting trajectories of one or more agents in a surrounding environment by using models trained on training data that is generated as described in this specification, an autonomous or semi-autonomous vehicle system can make better autonomous driving decisions or can provide better semi-autonomous driving recommendations for the operator of the vehicle.

By being able to compare between the short term intentions and the long term labels, in light of context (e.g. the presence of a cyclist in the scene suggests that the car was just nudging, rather than performing a lane change intent), the system can combine this information and produce final high quality labels. For instance a short term label of 1 and a long term label of 0 may be combined into a final label of 1, if the context suggested that this was the most accurate combination.

In some cases, the outcome of combining short term intentions and long term labels can be a soft label in [0, 1] indicating the system's confidence in the ground truth label. For instance, if the system is not able to reliably discern whether the agent was intending to make a lane change due to discrepancy between the short term and long term labels, the system can assign a label of 0.5. Some machine learning models can take advantage of being trained on such soft labels to produce better predictions at inference time (i.e. after training).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
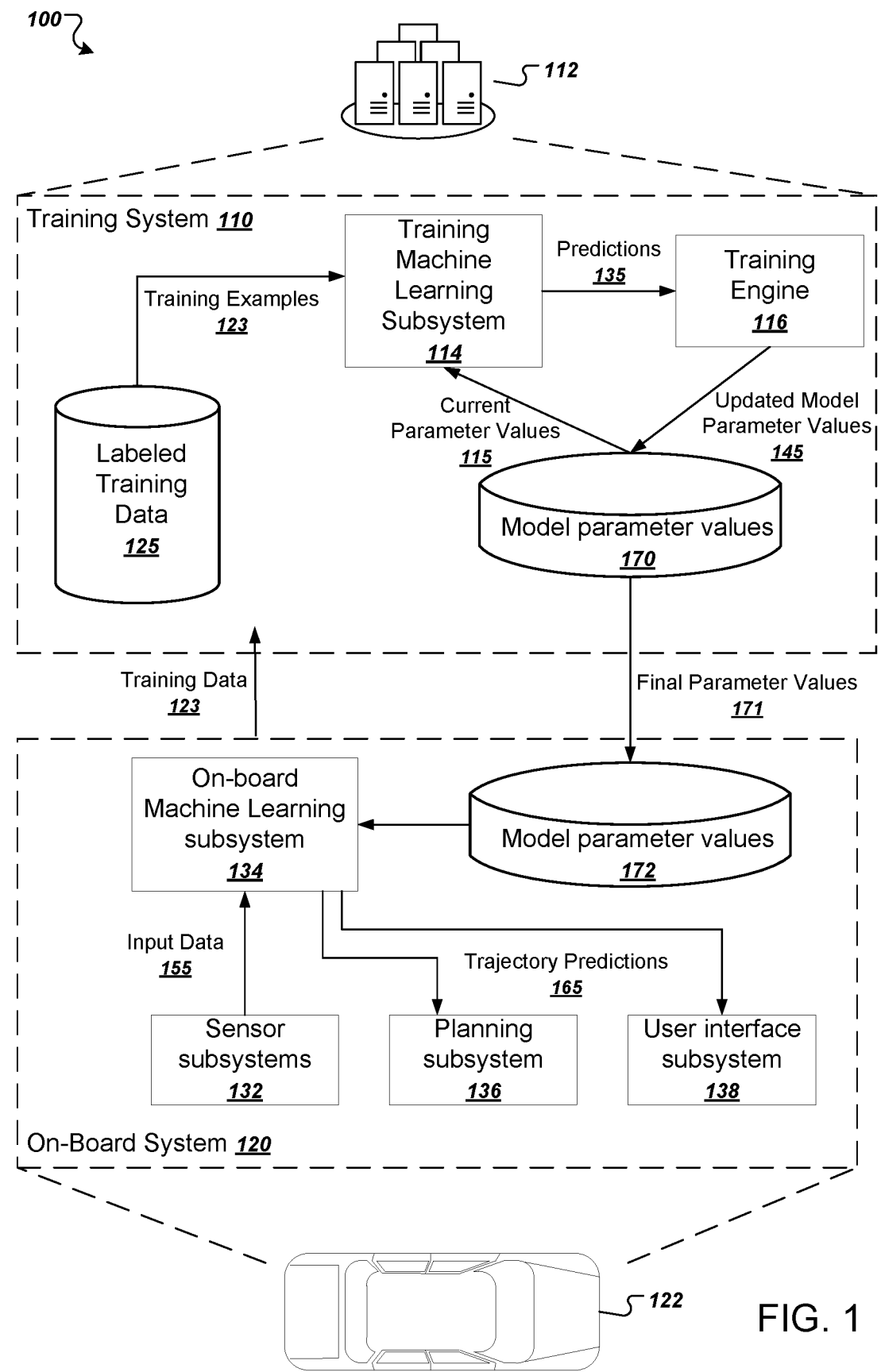
FIG. 1 is a diagram of an example system.

This specification describes how a training system can generate training data for training a machine learning model to perform trajectory prediction. Once the model has been trained, a vehicle, e.g., an autonomous or semi-autonomous vehicle, can use the machine learning model to generate behavior predictions for one or more agents in the environment.

Behavior prediction models can predict the trajectory of an agent in an environment based on input data that characterizes the agent in the environment. These machine learning models are trained using training data which includes a training input and a ground-truth probability for one or more candidate trajectories. Examples of machine learning models can include a decision forest, a neural network, a support vector machine, and so on.

Conventionally, auto-labeling is a method where a training input can be automatically labeled based on a predetermined rule using existing knowledge of the world. In behavior prediction, the training input includes: (i) data characterizing an agent in an environment as of a current time and (ii) data characterizing a candidate trajectory of the agent in the environment for a first time period that is after the current time. The candidate trajectory can be labeled based on what actually happened in a future time period that is after the current time. For example, if a car ends up making a left turn in 5 seconds from the current time, the system can determine that a left-turn trajectory occurred and that any other trajectories did not occur. This kind of label can be defined as a long-term label that captures what the agent ended up doing.

The above method generates trajectory labels only based on what happened in the future, rather than what the agent intended to do as of the time at which the trajectory prediction would have been made. For example, if a driver plans to make a lane change, but decided to cancel the lane change due to a potential hazard, the trajectory labelling method above fails to capture the lane change trajectory as having occurred. As another example, if a driver was intending to yield to a cyclist but then the cyclist stopped and waved for the car to proceed, the yielding trajectory will be labeled as not occurred.

When only long-term labels are used in training, the machine learning models trained using this type of labeled training data become agnostic to intentions. This is because intentions can change in light of changes to the environment, and the auto-labeling method is designed to look at what eventually happened.

Another way of generating trajectory labels is to focus on what the agent intended to do in the future rather than what happened in the future because the agent may modify their planned or intended trajectory in light of new changes in the environment. This kind of label can be defined as a short-term label that captures what the agent intended to do within a short period of time after a current time.

In this specification, an agent's intent, intention, or plan are defined as a trajectory plan that the agent has started executing but might not complete due to changes in the environment. For example, an agent can start making a lane change, but later abort the lane change because a nearby car is speeding up in the lane that the agent planned to change to.

This specification describes how a training system can generate a trajectory label for a training input from both a short-term intent and a long-term result of an agent in the environment. Each trajectory label can include a ground-truth probability for each of one or more candidate trajectories of an agent in the environment. A machine learning model can be trained using such training input and labeled trajectories to perform trajectory prediction.

As used in this description, a "fully-learned" machine learning model is a model that is trained to compute a desired prediction. In other words, a fully-learned model generates an output based solely on training data rather than on human-programmed decision logic.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses trajectory predictions to inform fully-autonomous driving decisions. The vehicle 122 can also be a semi-autonomous vehicle that uses trajectory predictions to aid a human driver. For example, the vehicle 122 can autonomously apply the brakes if a trajectory prediction indicates that a nearby vehicle is about to make a lane change.

The on-board system 120 includes one or more sensor subsystems 132. The sensor subsystems include a combination of components that receive reflections of electromagnetic radiation, e.g., laser systems that detect reflections of laser light, radar systems that detect reflections of radio waves, and camera systems that detect reflections of visible light.

The sensor subsystems 132 provide input data 155 to an on-board machine learning subsystem 134. The input data 155 characterizes a scene in the vicinity of the autonomous vehicle, including an agent in an environment. The agent can include a dynamic object in the environment, e.g., a vehicle, a cyclist, or a pedestrian, and so on. For example, the input data 155 can include an image of a nearby car in the scene captured by the camera systems.

The on-board machine learning subsystem 134 implements the operations of a machine learning model, e.g., operations of each layer of a neural network, trained to predict trajectories for the agent in the environment characterized in the input data 155. In some implementations, the machine learning model can generate confidence scores for one or more candidate trajectories of the agent for a future time period. In some implementations, the machine learning model can generate a new trajectory of the agent. The techniques and approaches described in this specification can generate training data suitable for training machine learning model for either of these implementations. Thus, the on-board machine learning subsystem 134 includes one or more computing devices having software or hardware modules that implement the respective operations of a machine learning model, e.g., operations of a neural network according to an architecture of the neural network.

The on-board machine learning subsystem 134 can implement the operations of a machine learning model by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board machine learning subsystem 134 can use hardware acceleration or other special-purpose computing devices to implement the operations of a machine learning mode. For example, some operations of some layers of a neural network model may be performed by highly parallelized hardware, e.g., by a graphics processing unit or another kind of specialized computing device. In other words, not all operations of each layer need to be performed by central processing units (CPUs) of the on-board machine learning subsystem 134.

The on-board machine learning subsystem 134 generates trajectory predictions 165 for one or more agents in the environment based on input data 155 that characterizes the one or more agents in the environment. Each trajectory prediction 165 can include a predicted trajectory of an agent related to lane changing, yielding, slowing down, making a U-turn, and so on. The agent can include a dynamic object in the environment, e.g., a vehicle, a pedestrian, a cyclist, and so on The on-board machine learning subsystem 134 can provide trajectory predictions 165 to a planning subsystem 136, a user interface subsystem 138, or both.

When a planning subsystem 136 receives the trajectory predictions 165, the planning subsystem 136 can use the trajectory predictions 165 to make fully-autonomous or semi-autonomous driving decisions. For example, the planning subsystem 136 can generate a fully-autonomous plan to slow down if a trajectory prediction of a nearby vehicle indicates that the nearby vehicle is cutting-in in front of the autonomous vehicle. As another example, the planning subsystem 136 can generate a semi-autonomous recommendation for a human driver to apply the brakes if a trajectory prediction indicates that a nearby cyclist is about to make a left turn.

A user interface subsystem 138 can receive the trajectory predictions 165 and can generate a user interface presentation that indicates trajectory predictions of nearby agents, e.g., a pedestrian or a nearby vehicle. For example, the user interface subsystem 138 can generate a user interface presentation having image or video data containing a representation of a trajectory prediction of a nearby vehicle. An on-board display device can then display the user interface presentation for passengers of the vehicle 122.

The on-board machine learning subsystem 134 can also use the input data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training machine learning subsystem 114 that can implement the operations of a machine learning model that is designed to perform trajectory predictions from input data. The training machine learning subsystem 114 includes a plurality of computing devices having software or hardware modules that implement the respective operations of a machine learning model.

The training machine learning model generally has the same model architecture as the on-board machine learning model. However, the training system 110 need not use the same hardware to compute the operations of each layer. In other words, the training system 110 can use CPUs only, highly parallelized hardware, or some combination of these.

The training machine learning subsystem 114 can compute the operations of the machine learning model using current parameter values 115 stored in a collection of model parameter values 170. Although illustrated as being logically separated, the model parameter values 170 and the software or hardware modules performing the operations may actually be located on the same computing device or on the same memory device.

The training system 110 or the on-board system 120 can generate labeled training data 125 from training data 123. The labeled training data 125 includes training examples 123 and each training example includes a training input and a training label. Each training input includes (i) data characterizing an agent in an environment as of a first time and (ii) data characterizing a candidate trajectory of the agent in the environment for a first time period that is after the first time. For example, a training input can include (i) a camera image of the scene and a top-down road graph rendering the surrounding of a self-driving car (SDC) and (ii) three possible trajectories for the SDC, including: left-turn, right turn, and moving straight.

A label for a training input can include ground-truth probabilities for one or more candidate trajectories. Each ground-truth probability for a candidate trajectory is a probability that should be assigned to the candidate trajectory by the trajectory prediction machine learning model. For example, a label for a training input can include a positive label for a candidate trajectory that indicates that an agent is making a left-turn.

The ground-truth probability for a candidate trajectory can be determined based on a long-term label and a short-term label for the candidate trajectory.

The long-term label for the candidate trajectory indicates whether the agent actually followed the candidate trajectory for a first time period after a first time.

The short-term label for the candidate trajectory indicates whether the agent intended to follow the candidate trajectory. More details regarding generating a trajectory label from a short-term label and a long-term label will be described in connection with FIG. 2. The ground-truth probability for a candidate trajectory can be associated with the training input, resulting in labeled training data 125.

The training machine learning subsystem 114 can generate, for each training example 123, one or more trajectory predictions 135. Each trajectory prediction 135 can include a score that represents a likelihood that an agent in the training input will follow a trajectory corresponding to the trajectory prediction. A training engine 116 analyzes the trajectory predictions 135 and compares the trajectory predictions to the labels in the training examples 123. The training engine 116 then generates updated model parameter values 145 by using an appropriate updating technique based on differences between the trajectory predictions and the trajectory labels. For example, when training a neural network model, the training engine 116 can generate updated model parameter values by stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
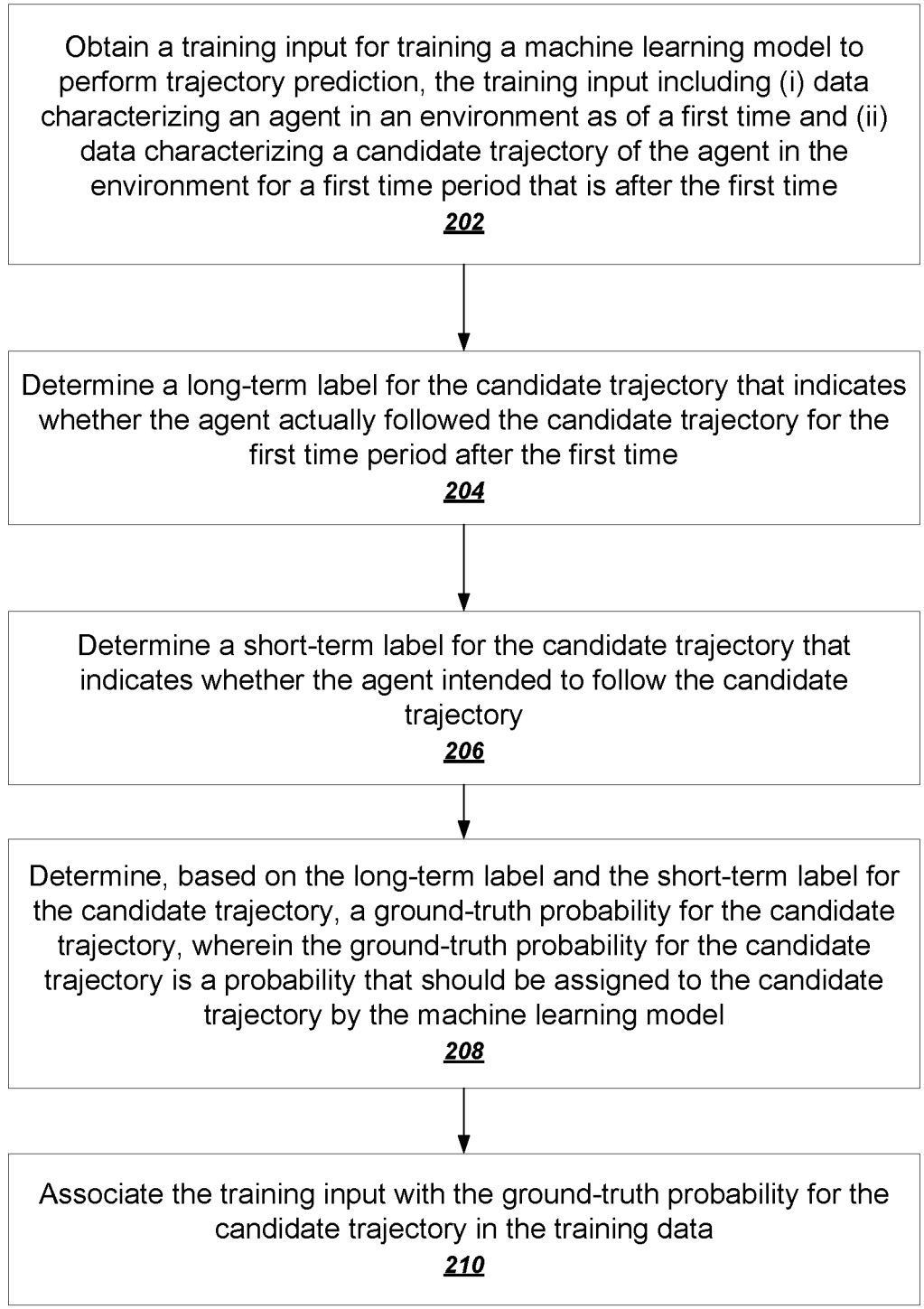
FIG. 2 is a flowchart of an example process for generating a trajectory label from a short-term intention and a long-term result.

FIG. 2 is a flowchart of an example process for generating trajectory label from a short-term intention and a long-term result. The process will be described as being performed by a training system 110. In some implementations, the process can also be performed by an on-board system 120.

The system obtains a training input for training a machine learning model to perform trajectory prediction (202). The training input can include (i) data characterizing an agent in an environment as of a first time and (ii) data characterizing a candidate trajectory of the agent in the environment for a first time period that is after the first time.

An agent in an environment can include cars, trucks, pedestrians and cyclists, and any other dynamic object in the environment. A candidate trajectory can be a path through the environment that the agent could traverse after the point in time at which the agent is characterized in the training input. In some implementations, the candidate trajectory can be a sequence of positions. In some other implementations, the candidate trajectory can be a high level abstract description, e.g., changing to left lane, changing to right lane, yielding, turning right, turning left, making a U-turn, and other possible agent trajectories or actions, etc. Additionally, data characterizing a candidate trajectory can include speed information of the agent, e.g., slowing down, speeding up.

For example, the training input can include a camera image characterizing a car in the scene as of 5:00:00 pm, i.e., the first time. The car can have three possible directions to take: turning left, turning right, or moving straight. The training input can include data characterizing a candidate trajectory, e.g., turning left. The candidate trajectory can include locations of the car for the first 5 seconds that is after the first time, i.e., from 5:00:00 pm to 5:00:05 pm.

In some implementations, instead of one candidate trajectory, the training input can include data characterizing a plurality of candidate trajectories of the agent in the environment for a first time period after the first time. For example, the training input can include a candidate trajectory for turning left, a candidate trajectory for turning right, and a candidate trajectory for moving straight. The example process in FIG. 2 can generate trajectory labels for each candidate trajectory of the plurality of candidate trajectories in the training input.

The system determines a long-term label for a candidate trajectory that indicates whether the agent actually followed the candidate trajectory for a first time period after a first time (204). The long-term label captures what the agent ended up doing. In some implementations, the system can determine the long-term label by determining whether log data that tracks movement of the agent after the first time indicates that the agent followed the candidate trajectory after the first time.

For example, if after 3 or 5 seconds, driving logs indicate that the car ended up turning left or the agent ended up being close to the left turn trajectory, the system can label the candidate trajectory of turning-left as occurred, and the other candidate trajectories as not occurred. In some implementations, a long-term label for the 3 candidate trajectories (left-turn, right-turn, moving straight) can be (1, 0, 0).

The system determines a short-term label for the candidate trajectory that indicates whether the agent intended to follow the candidate trajectory (206). The short-term label captures what the agent intended to do, even if the intention did not happen or did not get completed in the future.

In some implementations, the system can determine a short-term label by determining whether the agent followed a candidate trajectory for an initial time period immediately after the first time, where the initial time period is shorter than the first time period and starts at the beginning of the first time period, i.e., occurs at the very beginning of the time interval covered by the candidate trajectory.

For example, the system can determine how the agent is following a candidate trajectory in a short time by measuring Euclidean distance, e.g., the shortest Euclidean distance or the average Euclidean distance, between the agent's short term trajectory and a candidate trajectory within 1 second after the first time. The Euclidean distance can be used to determine the intent of the agent, even if the agent ended up taking a different trajectory.

In some implementations, the system can use a dynamic time warping operation to measure which one of a plurality of candidate trajectories provides best match with the actual short-term trajectory. Generally, dynamic time warping (DTW) is an algorithm for measuring similarity between two temporal sequences, which may vary in speed. For example, the system can use dynamic time warping to align trajectories that match in geometry even if those trajectories do not match in speed. The system can then assign as the short-term label the label corresponding to the candidate trajectory that best matches the actual short-term trajectory after the time warping has been applied.

In some implementations, the system can determine a short-term label by determining whether the agent had a heading that matches a heading required to follow the candidate trajectory for an initial time period immediately after the first time. The heading of an agent can be a compass direction or other orientation in which the agent's front or nose is pointed. So 0° (or 360° can indicate a direction toward true North, and 90° can indicate a direction towards true East, and 180° can indicate true South, and 270° can indicate true West.

For example, the system can determine how the agent is following a candidate trajectory in a short time period by comparing the agent's short term heading direction and a candidate trajectory within 1 second after a first time. The heading direction can be used to determine the intent of the agent, even if the agent ended up taking a different trajectory.

In some implementations, the system can determine the short-term label by determining, from appearance information characterizing an appearance of the agent within a first time window after the first time, whether the agent intended to follow a candidate trajectory. In some implementations, the agent can be a vehicle and the appearance information can indicate whether any of one or more turn signals of the vehicle are turned on.

For example, the system can determine a short-term label for a left-turn candidate trajectory of a vehicle from a turn signal light of the vehicle. If within 1-2 seconds after a first time, the left-turn signal light is on, the system can determine a short-term label being a value that indicates that the vehicle intended to follow a left-turn candidate trajectory. For example, a short-term label for 3 candidate trajectories (left-turn, right-turn, moving straight) can be (1, 0, 0), indicating that the vehicle intended to make a left-turn and did not intend to make a right turn or move straight.

As another example, the appearance information can be information indicating the appearance of other agents in the vicinity of the agent. For example, the system can obtain information indicating that a pedestrian in the vicinity of a vehicle does not intend to cross the street, e.g., information indicating that the pedestrian is waving for the car to continue on. The system can use this information to determine that the car intended to yield to the pedestrian but did not because of the indication received from the pedestrian.

Generally, the system can use any technique that could be used to generate a long-term label but with a shortened time horizon to generate the short-term label. That is, if observing the entire trajectory In some implementations, for a given candidate trajectory, the system can determine the short-term label based on some combination of the above observations, e.g., trajectory for an initial time period, heading information, and appearance information. The system can determine the short-term label based on at least a number of observations, indicating that the candidate trajectory is being followed by the agent. For example, if two or more of these observations indicate that the agent intended to follow the left-turn trajectory, the system can determine the short-term label as "the vehicle intended to make a left-turn".

The short-term label that captures what an agent intended to do can be used to train a machine learning model that can predict those intentions or those plans of other agents, e.g., people, or vehicles. That is, in some implementations, the system uses the short-term labels as the final labels without considering the long-term labels. An autonomous or semi-autonomous vehicle system can have better interaction with other agents by planning the SDC's behavior proactively. For example, the SDC can proactively slow down to let a nearby car finish making a lane change when the SDC determines an intention of the nearby car. As another example, the SDC can perform tradeoff analysis based on a predicted intention of a nearby cyclist on the right and a predicted intention of a nearby vehicle on the left.

The long-term label and the short-term label for the candidate trajectory can provide the advantage of capturing both what happened in the future and what the agent intended to do at the time of prediction. For example, a car that wanted to make a lane change and tried to make a lane change may end up cancelling the lane change due to changes in the environment. According to the labeling method discussed above, the system can determine a long-term label that indicates the car followed a candidate trajectory of moving straight. The system can also determine a short-term label that indicates the car wanted to make the lane change initially.

The system determines, based on the long-term label and the short-term label for the candidate trajectory, a ground-truth probability for the candidate trajectory (208). The ground-truth probability for the candidate trajectory is a probability that should be assigned to the candidate trajectory by a machine learning model. More details regarding generating the ground-truth probability from the long-term label and the short-term label will be discussed in connection with FIG. 3.

The system associates the training input with the ground-truth probability for the candidate trajectory in the training data (210). By associating the training input with the ground-truth probability, the system can generate labeled training data 125. Training examples 123 sampled from labeled training data 125 can be used to train a machine learning model to perform trajectory prediction.

Figure 3:
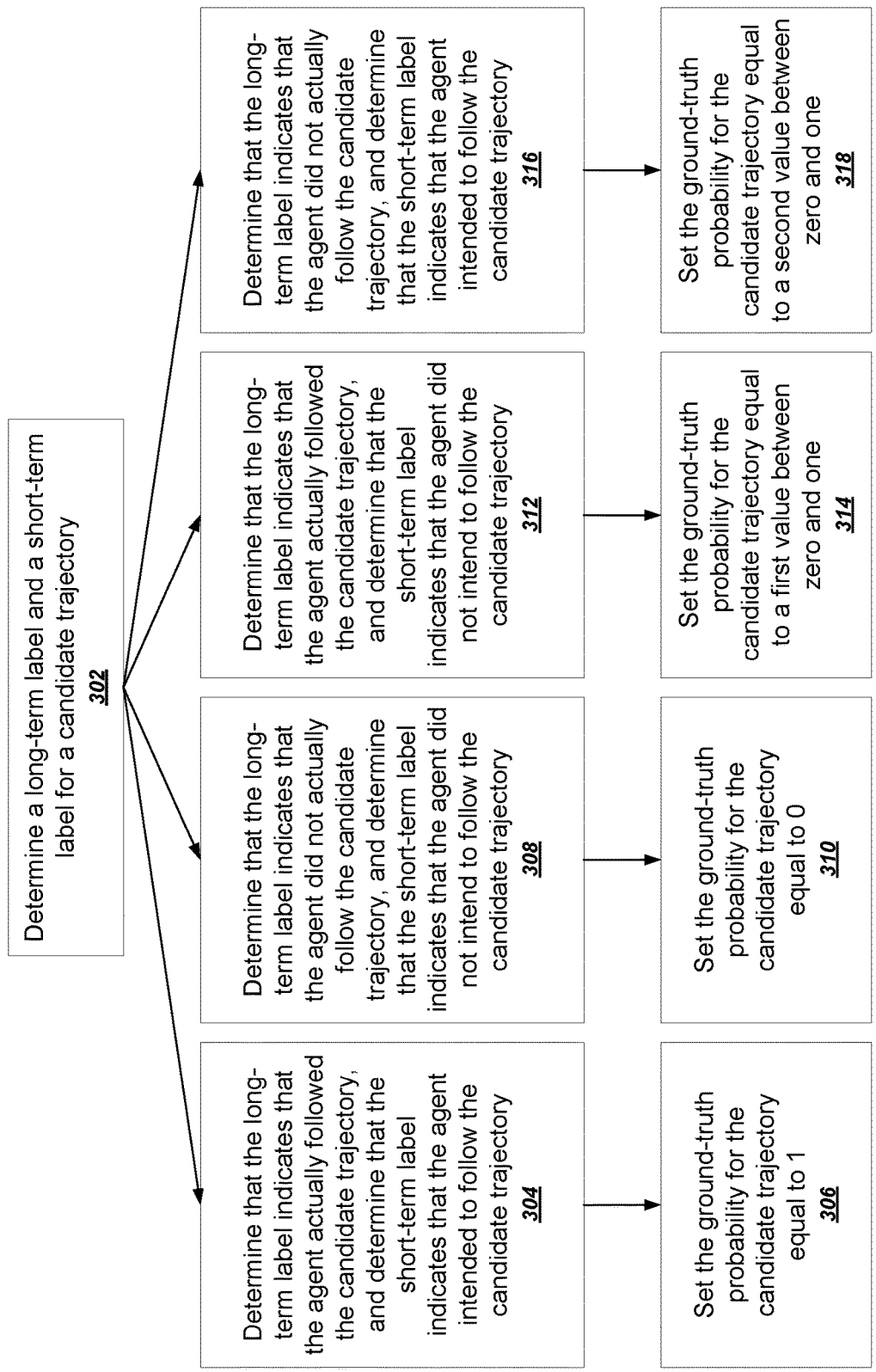
FIG. 3 is a flowchart of an example process for generating a ground-truth probability from a short-term label and a long-term label for a candidate trajectory.

FIG. 3 is a flowchart of an example process for generating a ground-truth probability from a short-term label and a long-term label for a candidate trajectory. The process will be described as being performed by a training system 110. In some implementations, the process can also be performed by an on-board system 120.

After the system determines a long-term label and a short-term label for a candidate trajectory (302), the short-term label and the long-term label can have four possible combinations 304, 308, 312, and 316.

In 304, the system determines that the long-term label indicates that the agent actually followed a candidate trajectory after the first time. The system also determines that the short-term label indicates that the agent intended to follow the candidate trajectory. In this case, the system sets the ground-truth probability for the candidate trajectory equal to 1 (306).

In 308, the system determines that the long-term label indicates that the agent did not actually follow the candidate trajectory after the first time. The system also determines that the short-term label indicates that the agent did not intend to follow the candidate trajectory. The system sets the ground-truth probability for the candidate trajectory equal to 0 (310).

In 312, the system determines that the long-term label indicates that the agent actually followed the candidate trajectory after the first time. The system also determines that the short-term label indicates that the agent did not intend to follow the candidate trajectory. The system sets the ground-truth probability for the candidate trajectory equal to a first value between zero and one (314). The ground-truth probability that is between zero and one can indicate that the candidate trajectory might have occurred. For example, the system can set the ground-truth probability to 0.5.

In 316, the system determines that the long-term label indicates that the agent did not actually follow the candidate trajectory after the first time. The system also determines that the short-term label indicates that the agent intended to follow the candidate trajectory. The system sets the ground-truth probability for the candidate trajectory equal to a second value between zero and one (318). The ground-truth probability that is between zero and one can indicate that the candidate trajectory might have occurred. For example, the system can set the ground-truth probability to 0.5.

In some implementations, when the long-term label and the short-term label indicate different labels for a candidate trajectory, such as the situations described in 312 or 316, the system can instead decide to adopt one of the labels. For example, the system can set the ground-truth probability based only on the short-term label if a machine learning model is intended to be trained to predict short-term intention of an agent in the environment. In some implementations, the system can send the data example for labeling by a user to determine a meaningful label.

In some implementations, when the long-term label and the short-term label indicate different labels for a candidate trajectory, the system can determine the ground-truth probability based on whether the system would like the ground-truth probability to capture more of the intention of the agent, or to capture what happened in the future more.

For example, the system can set the ground-truth probability to 0.5 by default when the long-term label and the short-term label indicate different labels for a candidate trajectory. As another example, the system can set the ground-truth probability for the candidate trajectory to a weighted sum of the short-term label and the long-term label of the candidate trajectory. The system can assign a larger weight to the short-term label if the labeled training data is designed to capture more of the intention of the agent. The system can assign a larger weight to the long-term label if the labeled training data is designed to capture what happened in the future more.

In some implementations, when the long-term label and the short-term label indicate different labels for a candidate trajectory, the system can determine the ground-truth probability based on whether the system has different confidence for the long-term label and the short-term label. For example, when a long-term label for a candidate trajectory is 1 and a short-term label for the candidate trajectory is 0, the system can set a ground-truth probability for the candidate trajectory to be 0.8. This is because the system is more confident about the long-term label and the system is less confident about the short-term label because there are multiple possible short-term candidate trajectories that are close to each other.

In some implementations, when the long-term label and the short-term label indicate different labels for a candidate trajectory, the system can determine a ground-truth probability from context cues from a scene.

Figure 4:
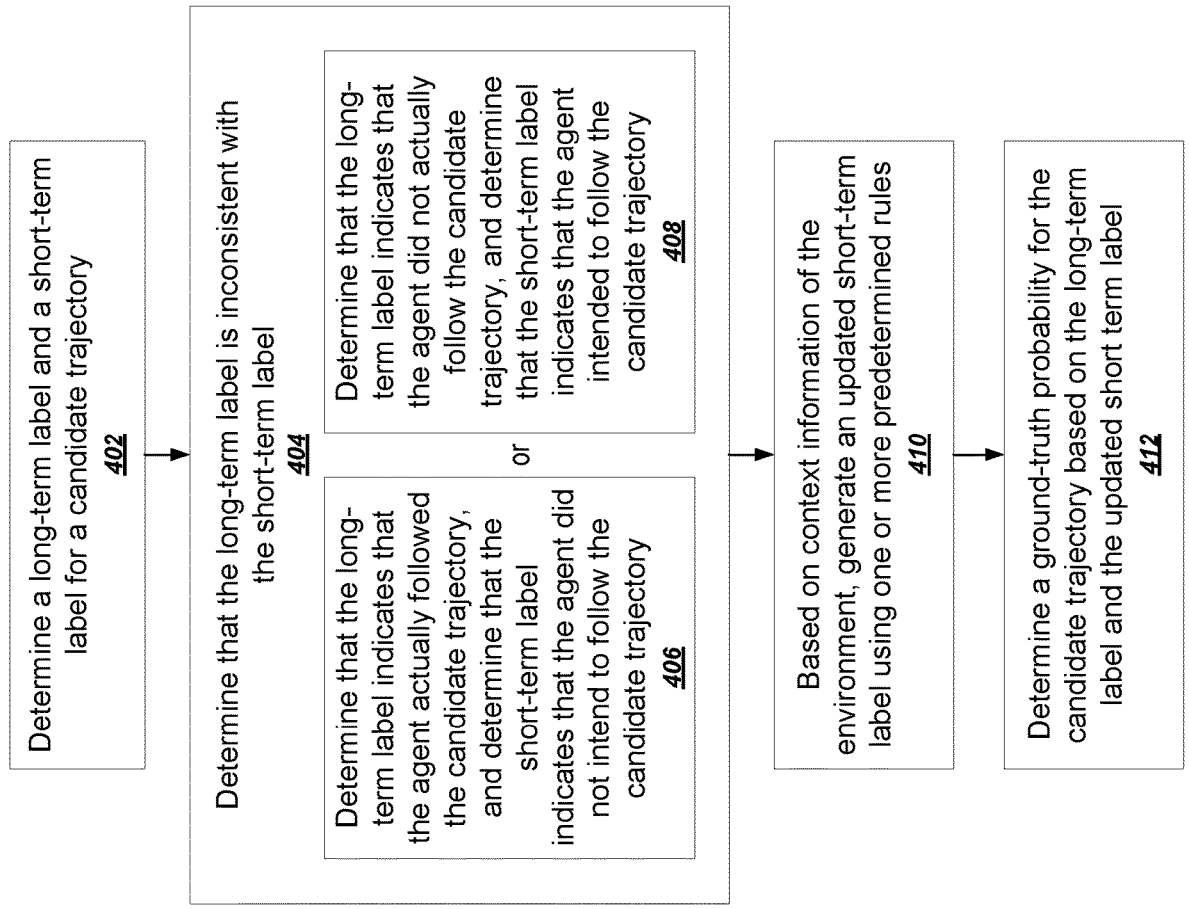
FIG. 4 is a flowchart of an example process for generating a ground-truth probability from an updated short-term label for a candidate trajectory based on context information of an environment.

FIG. 4 is a flowchart of an example process for generating a ground-truth probability from an updated short-term label for a candidate trajectory based on context information of an environment. The process will be described as being performed by a training system 110. In some implementations, the process can also be performed by an on-board system 120.

After the system determines a long-term label and a short-term label for a candidate trajectory (402), the system may determine that the long-term label is inconsistent with the short-term label (404). In some implementations, the system determines that the long-term label indicates that the agent actually followed the candidate trajectory and the system also determines that the short-term label indicates that the agent did not intend to follow the candidate trajectory (406). In some implementations, the system determines that the long-term label indicates that the agent did not actually follow the candidate trajectory and the system also determines that the short-term label indicates that the agent intended to follow the candidate trajectory (408).

Based on context information of the environment, the system can generate an updated short-term label using one or more predetermined rules (410). Context information can include context cues from a scene of the environment. For example, context information can include presence of a pedestrian in the scene, an observed speed, or a change of a speed, of another vehicle in the scene, or appearance information of another agent in the scene. The system can obtain context information by analyzing a sequence of top-down road graphs, camera images or videos, radar signals, lidar signals, and so on. Based on context information of the environment, the system can either confirm or reject a short-term label of a candidate trajectory.

For example, a short-term label of a lane change candidate trajectory can indicate that a car intended to make a lane change by nudging a little bit to the left. However, in fact, the car is yielding to a cyclist in the scene, and the car has no intention for making a lane change. A long-term label of the lane change trajectory can indicate that the car did not follow a lane change trajectory. The system can determine that the long-term label is inconsistent with the short-term label. The system can perform object detection analysis of a training input characterizing the scene and the system can determine that there is a cyclist next to the car. Based on context information that indicates there is a cyclist in the scene, the system can refute the short-term label because the car wasn't intending to make a lane change. The short-term trajectory that looked like a lane change was for a different reason, i.e., yielding to the cyclist. The system can generate an updated short-term label that indicates the car did not intend to make the lane change.

As another example, a short-term label of a yielding candidate trajectory indicates that a car X plans to yield to a car Y. However, because the car Y started to slow down after the car X started to yield to the car Y, the car X ended up proceeding without yielding to car Y. A long-term label indicates that the car X did not end up yielding to the car Y. The system can determine that the long-term label is inconsistent with the short-term label. The system can obtain a video of the scene and the system can analyze and determine that the car Y next to the car X started to slow down. Based on context information that indicates the car Y started to slow down, the system can confirm and accept the short-term label because the car X was intending to yield but modified its planned trajectory due to a change in the behavior of the car Y. The system can generate an updated short-term label that is the same as the original short-term label that indicates the car X intended to yield to car Y even though the long-term label indicates that the car X did not follow the yield trajectory at the end.

The system can determine a ground-truth probability for the candidate trajectory based on the long-term label and the updated short-term label (412). After confirming or rejecting the short-term label, the system can determine a ground truth probability following the process as described previously in connected with FIG. 3.

In some implementations, based on context information of the environment, the system can generate an updated long-term label. The system can then determine a ground-truth probability for the candidate trajectory based on the updated long-term label and the (updated) short-term label.

In some implementations, a machine learning model can have separate output heads, e.g., one for what the agent intended to do and one for what actually happened in the future. The machine learning model can be trained using trajectory labels that capture both short-term intents and long-term results. The machine learning model can be trained to generate more fine-grained trajectory predictions including what an agent wanted to do and what an agent ended up doing. The fine-grained trajectory prediction generated by the machine learning model can be provided to the planning subsystem 136 to make better autonomous or semi-autonomous driving decisions.

In some implementations, trajectory labels generated from both short-term intent and long-term result can be used for data mining, evaluating, and analyzing behavior of a trained machine learning model. When performing evaluation of a trained machine learning model, example cases that indicate inconsistency between predicted trajectory and resulting trajectory can be selected from labeled training data 125. These example cases can include interesting situations that can be used to evaluate and analyze performance of a trained machine learning model.

In some implementations, trajectory labels generated from both short-term intent and long-term result can be used to trigger human label operations. When a short-term label and a long-term label contradicts with each other for a training input, the training-input can be selected as having uncertain label. Human label can be requested for training inputs with uncertain labels in order to get cleaner training data, i.e., a more accurate label for the training input. In this way, expensive human label operations to get more accurate labels are only triggered for challenging training inputs with uncertain labels. Depending on whether the machine learning model to be trained is intended to capture the plan or the actual future behavior, high quality human label can be obtained according to the purpose of the machine learning model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of generating training data for training a machine learning model to perform trajectory prediction, comprising:
   obtaining a training input, the training input comprising (i) data characterizing an agent in an environment as of a first time and (ii) data characterizing a candidate trajectory of the agent in the environment for a first time period that is after the first time;
   determining a long-term label for the candidate trajectory that indicates whether the agent actually followed the candidate trajectory for the first time period after the first time;
   determining a short-term label for the candidate trajectory that indicates whether the agent intended to follow the candidate trajectory;
   determining, based on the long-term label and the short-term label for the candidate trajectory, a ground-truth probability for the candidate trajectory, wherein the ground-truth probability for the candidate trajectory is a probability that should be assigned to the candidate trajectory by the machine learning model;
   associating the training input with the ground-truth probability for the candidate trajectory in the training data; and
   training the machine learning model on the training data.

2. The method of claim 1, wherein determining, based on the long-term label and the short-term label for the candidate trajectory, a ground-truth probability for the candidate trajectory comprises:
   determining that the long-term label indicates that agent actually followed the candidate trajectory after the first time;
   determining that the short-term label indicates that the agent intended to follow the candidate trajectory; and
   based on determining that the long-term label indicates that agent actually followed the candidate trajectory after the first time and determining that the short-term label indicates that the agent intended to follow the candidate trajectory, setting the ground-truth probability for the candidate trajectory equal to 1.

3. The method of claim 1, wherein determining, based on the long-term label and the short-term label for the candidate trajectory, a ground-truth probability for the candidate trajectory comprises:
   determining that the long-term label indicates that agent did not actually follow the candidate trajectory after the first time;
   determining that the short-term label indicates that the agent did not intend to follow the candidate trajectory; and
   based on determining that the long-term label indicates that agent did not actually follow the candidate trajectory after the first time and determining that the short-term label indicates that the agent did not intend to follow the candidate trajectory, setting the ground-truth probability for the candidate trajectory equal to 0.

4. The method of claim 1, wherein determining, based on the long-term label and the short-term label for the candidate trajectory, a ground-truth probability for the candidate trajectory comprises:
   determining that the long-term label indicates that agent actually followed the candidate trajectory after the first time;
   determining that the short-term label indicates that the agent did not intend to follow the candidate trajectory; and
   based on determining that the long-term label indicates that agent actually followed the candidate trajectory after the first time and determining that the short-term label indicates that the agent did not intend to follow the candidate trajectory, setting the ground-truth probability for the candidate trajectory equal to a first value between zero and one.

5. The method of claim 1, wherein determining, based on the long-term label and the short-term label for the candidate trajectory, a ground-truth probability for the candidate trajectory comprises:
   determining that the long-term label indicates that agent did not actually follow the candidate trajectory after the first time;
   determining that the short-term label indicates that the agent intended to follow the candidate trajectory; and
   based on determining that the long-term label indicates that agent did not actually follow the candidate trajectory after the first time and determining that the short-term label indicates that the agent intended to follow the candidate trajectory, setting the ground-truth probability for the candidate trajectory equal to a second value between zero and one.

6. The method of claim 1, wherein determining, based on the long-term label and the short-term label for the candidate trajectory, a ground-truth probability for the candidate trajectory comprises:
determining that the long-term label is inconsistent with the short-term label, comprising:
determining that the long-term label indicates that agent did not actually follow the candidate trajectory after the first time and the short-term label indicates that the agent intended to follow the candidate trajectory, or
determining that the long-term label indicates that agent actually followed the candidate trajectory after the first time and determining that the short-term label indicates that the agent did not intend to follow the candidate trajectory;
obtaining context information of the environment;
based on the context information of the environment, generating an updated short-term label using one or more predetermined rules; and
based on the long-term label and the updated short-term label for the candidate trajectory, determining a ground-truth probability for the candidate trajectory.

7. The method of claim 1, wherein determining a long-term label for the candidate trajectory that indicates whether the agent actually followed the candidate trajectory after the first time comprises:
determining whether log data that tracks movement of the agent after the first time indicates that the agent followed the candidate trajectory after the first time.

8. The method of claim 1, wherein determining a short-term label for the candidate trajectory that indicates whether the agent intended to follow the candidate trajectory comprises:
determining whether the agent followed the candidate trajectory for an initial time period immediately after the first time, wherein the initial time period is shorter than the first time period.

9. The method of claim 1, wherein determining a short-term label for the candidate trajectory that indicates whether the agent intended to follow the candidate trajectory comprises:
determining whether the agent had a heading that matches a heading required to follow the candidate trajectory for an initial time period immediately after the first time.

10. The method of claim 1, wherein determining a short-term label for the candidate trajectory that indicates whether the agent intended to follow the candidate trajectory comprises:
determining, from appearance information characterizing an appearance of the agent within a first time window after the first time, whether the agent intended to follow the candidate trajectory.

11. The method of claim 10, wherein the agent is a vehicle, and wherein the appearance information indicates whether any of one or more turn signals of the vehicle are turned on.

12. A system comprising:
one or more computers and one or more storage devices storing instructions that are operable, when executed by the one or more computers, to cause the one or more computers to perform operations comprising:
obtaining a training input, the training input comprising (i) data characterizing an agent in an environment as of a first time and (ii) data characterizing a candidate trajectory of the agent in the environment for a first time period that is after the first time;
determining a long-term label for the candidate trajectory that indicates whether the agent actually followed the candidate trajectory for the first time period after the first time;
determining a short-term label for the candidate trajectory that indicates whether the agent intended to follow the candidate trajectory;
determining, based on the long-term label and the short-term label for the candidate trajectory, a ground-truth probability for the candidate trajectory, wherein the ground-truth probability for the candidate trajectory is a probability that should be assigned to the candidate trajectory by a machine learning model that performs trajectory prediction;
associating the training input with the ground-truth probability for the candidate trajectory in training data; and
training the machine learning model on the training data.

13. The system of claim 12, wherein determining, based on the long-term label and the short-term label for the candidate trajectory, a ground-truth probability for the candidate trajectory comprises:
determining that the long-term label indicates that agent actually followed the candidate trajectory after the first time;
determining that the short-term label indicates that the agent intended to follow the candidate trajectory; and
based on determining that the long-term label indicates that agent actually followed the candidate trajectory after the first time and determining that the short-term label indicates that the agent intended to follow the candidate trajectory, setting the ground-truth probability for the candidate trajectory equal to 1.

14. The system of claim 12, wherein determining, based on the long-term label and the short-term label for the candidate trajectory, a ground-truth probability for the candidate trajectory comprises:
determining that the long-term label indicates that agent did not actually follow the candidate trajectory after the first time;
determining that the short-term label indicates that the agent did not intend to follow the candidate trajectory; and
based on determining that the long-term label indicates that agent did not actually follow the candidate trajectory after the first time and determining that the short-term label indicates that the agent did not intend to follow the candidate trajectory, setting the ground-truth probability for the candidate trajectory equal to 0.

15. The system of claim 12, wherein determining, based on the long-term label and the short-term label for the candidate trajectory, a ground-truth probability for the candidate trajectory comprises:
determining that the long-term label indicates that agent actually followed the candidate trajectory after the first time;
determining that the short-term label indicates that the agent did not intend to follow the candidate trajectory; and
based on determining that the long-term label indicates that agent actually followed the candidate trajectory after the first time and determining that the short-term label indicates that the agent did not intend to follow the candidate trajectory, setting the ground-truth probability for the candidate trajectory equal to a first value between zero and one.

16. The system of claim 12, wherein determining, based on the long-term label and the short-term label for the candidate trajectory, a ground-truth probability for the candidate trajectory comprises:
- determining that the long-term label indicates that agent did not actually follow the candidate trajectory after the first time;
- determining that the short-term label indicates that the agent intended to follow the candidate trajectory; and
- based on determining that the long-term label indicates that agent did not actually follow the candidate trajectory after the first time and determining that the short-term label indicates that the agent intended to follow the candidate trajectory, setting the ground-truth probability for the candidate trajectory equal to a second value between zero and one.

17. The system of claim 12, wherein determining, based on the long-term label and the short-term label for the candidate trajectory, a ground-truth probability for the candidate trajectory comprises:
- determining that the long-term label is inconsistent with the short-term label, comprising:
  - determining that the long-term label indicates that agent did not actually follow the candidate trajectory after the first time and the short-term label indicates that the agent intended to follow the candidate trajectory, or
  - determining that the long-term label indicates that agent actually followed the candidate trajectory after the first time and determining that the short-term label indicates that the agent did not intend to follow the candidate trajectory;
- obtaining context information of the environment;
- based on the context information of the environment, generating an updated short-term label using one or more predetermined rules; and
- based on the long-term label and the updated short-term label for the candidate trajectory, determining a ground-truth probability for the candidate trajectory.

18. A computer program product, encoded on one or more non-transitory computer storage media, comprising instructions that when executed by one or more computers cause the one or more computers to perform operations comprising:
- obtaining a training input, the training input comprising (i) data characterizing an agent in an environment as of a first time and (ii) data characterizing a candidate trajectory of the agent in the environment for a first time period that is after the first time;
- determining a long-term label for the candidate trajectory that indicates whether the agent actually followed the candidate trajectory for the first time period after the first time;
- determining a short-term label for the candidate trajectory that indicates whether the agent intended to follow the candidate trajectory;
- determining, based on the long-term label and the short-term label for the candidate trajectory, a ground-truth probability for the candidate trajectory, wherein the ground-truth probability for the candidate trajectory is a probability that should be assigned to the candidate trajectory by a machine learning model that performs trajectory prediction;
- associating the training input with the ground-truth probability for the candidate trajectory in training data; and
- training the machine learning model on the training data.

* * * * *